(12) United States Patent
Cha et al.

(10) Patent No.: US 10,843,744 B2
(45) Date of Patent: Nov. 24, 2020

(54) USER-ASSEMBLABLE VEHICLE

(71) Applicants: HYUNDAI MOTOR COMPANY, Seoul (KR); KIA Motors Corporation, Seoul (KR)

(72) Inventors: Dong Eun Cha, Hwaseong-si (KR); Jin Ho Hwang, Seoul (KR); Sang Heon Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 111 days.

(21) Appl. No.: 16/373,469

(22) Filed: Apr. 2, 2019

(65) Prior Publication Data

US 2020/0180706 A1 Jun. 11, 2020

(30) Foreign Application Priority Data

Dec. 11, 2018 (KR) .................. 10-2018-0158960

(51) Int. Cl.
*B62D 27/06* (2006.01)
*B62D 25/08* (2006.01)
(Continued)

(52) U.S. Cl.
CPC ............. *B62D 27/06* (2013.01); *B62D 25/08* (2013.01); *B62D 25/20* (2013.01); *B62D 31/00* (2013.01); *B62D 65/04* (2013.01)

(58) Field of Classification Search
CPC ........ B62D 27/06; B62D 25/08; B62D 25/20; B62D 31/00; B62D 65/04; B62D 63/025; B62D 25/00
(Continued)

(56) References Cited

U.S. PATENT DOCUMENTS 2,115,903 A * 5/1938 Breer ................... B62D 23/00
296/203.01
2,254,458 A * 9/1941 Swallow ............... B62D 23/00
296/191
(Continued)

FOREIGN PATENT DOCUMENTS

DE 19701571 A1 7/1998
DE 19833395 A1 2/2000
(Continued)

OTHER PUBLICATIONS

Extended European Search Report of corresponding European Patent Application No. 19166732.8—9 pages (dated Oct. 24, 2019).

*Primary Examiner* — Pinel E Romain
(74) *Attorney, Agent, or Firm* — McDonnell Boehnen Hulbert & Berghoff LLP

(57) ABSTRACT

A user-assemblable vehicle including: a platform module forming a bottom surface of the vehicle, and including a floor part provided with a power driving part and front and rear wheel parts provided on front and rear parts of the floor part, respectively; a front module coupled to a front part of the platform module to form a front part of the vehicle; a rear module coupled to a rear part of the platform module to form a rear part of the vehicle; and a cabin module having a space for accommodating passengers, being coupled to a rear end of the front module at a front end and coupled to a front end of the rear module at a rear end, and supported by the floor part of the platform module at a lower end when the cabin module slides from a side to an opposite side of the vehicle.

18 Claims, 6 Drawing Sheets

(51) Int. Cl.
*B62D 25/20* (2006.01)
*B62D 31/00* (2006.01)
*B62D 65/04* (2006.01)

(58) Field of Classification Search
USPC .......................................................... 296/29
See application file for complete search history.

(56) References Cited

U.S. PATENT DOCUMENTS

| | | | |
|---|---|---|---|
| 5,401,056 A | 3/1995 | Eastman | |
| 5,934,745 A * | 8/1999 | Moore | B62D 23/00 |
| | | | 296/181.2 |
| 6,286,896 B1 * | 9/2001 | Eipper | B62D 25/087 |
| | | | 296/187.03 |
| 7,287,797 B1 * | 10/2007 | Belloso | B62D 21/03 |
| | | | 296/181.2 |
| 8,550,544 B2 * | 10/2013 | Auer | B62D 29/005 |
| | | | 296/191 |
| 9,434,116 B2 * | 9/2016 | Masini | B62D 25/06 |
| 2010/0012596 A1 | 4/2010 | Chapman | |
| 2010/0102596 A1 | 4/2010 | Chapman | |
| 2016/0046241 A1 * | 2/2016 | Crismon | B60J 7/102 |
| | | | 224/326 |
| 2019/0033883 A1 * | 1/2019 | Ferguson | G06F 16/955 |

FOREIGN PATENT DOCUMENTS

| | | |
|---|---|---|
| DE | 19860794 A1 | 7/2000 |
| EP | 0142581 A1 | 5/1985 |
| KR | 10-1334697 B1 | 12/2013 |
| WO | 2013/156639 A1 | 10/2013 |

* cited by examiner

US 10,843,744 B2

USER-ASSEMBLABLE VEHICLE

CROSS REFERENCE TO RELATED APPLICATION

The present application claims priority to Korean Patent Application No. 10-2018-0158960, filed Dec. 11, 2018, the entire contents of which is incorporated herein for all purposes by this reference.

BACKGROUND

Field

The present disclosure relates generally to a user-assemblable vehicle.

Description of the Related Art

In the automobile manufacturing field, automobile manufacturers develop and manufacture various vehicle models based on vehicle sales strategies to meet the needs of consumers. However, since most vehicles are manufactured in an integral type, the consumers can select only one from various vehicle models manufactured in advance, but they cannot individually design the vehicle according to desired tastes or uses.

The foregoing is intended merely to aid in the understanding of the background of the present invention, and Applicant does not admit that any information contained in this section constitutes prior art.

SUMMARY

Accordingly, one aspect of the present invention proposes a user-assemblable vehicle that is realized by modularizing each component of the vehicle and is assembled by a purchaser or an owner of the vehicle by selecting each component therefor.

Another aspect of the invention provides a user-assemblable vehicle that includes: a platform module forming a bottom surface of the vehicle and including a floor part provided with a power driving part and front and rear wheel parts provided on front and rear parts of the floor part, respectively; a front module coupled to a front part of the platform module to form a front part of the vehicle; a rear module coupled to a rear part of the platform module to form a rear part of the vehicle; and a cabin module having a space therein for accommodating passengers, wherein the cabin module is coupled to a rear end of the front module at a front end thereof and coupled to a front end of the rear module at a rear end thereof and supported by the floor part of the platform module at a lower end thereof when the cabin module slides from a side to an opposite side of the vehicle.

The front module may be provided with a front wheel housing corresponding to the front wheel part of the platform module, and the rear module may be provided with a rear wheel housing corresponding to the rear wheel part of the platform module.

The front module may be selected from a front module group including a plurality of front modules having different shapes and may be coupled to the front part of the platform module. The plurality of front modules of different shapes may have the same shape at the rear ends thereof coupled with the front end of the cabin module.

The rear module may be selected from a rear module group including a plurality of rear modules having different shapes and may be coupled to the rear part of the platform module. The plurality of rear modules of different shapes may have the same shape at the front ends thereof coupled with the rear end of the cabin module.

The cabin module may be selected from a cabin module group including a plurality of cabin modules having different shapes and may be supported by the floor part of the platform module. The plurality of cabin modules of different shapes may have the same shape at the front ends thereof coupled with the rear end of the front module and the same shape at the rear ends thereof coupled with the front end of the rear module.

The rear part of the front module may extend upward from a lower end thereof and include a first part inclined toward a front end of the vehicle and a second part extending upward from an upper end of the first part and inclined toward a rear end of the vehicle. The front end of the cabin module may be configured to correspond to the first and second parts, so that the front end of the cabin module may fit at the rear end of the front module when the cabin module is slidingly assembled.

The front part of the rear module may extend upward from a lower end thereof and include a third part inclined toward the rear end of the vehicle and a fourth part extending upward from an upper end of the third part and inclined toward a front end of the vehicle. The rear end of the cabin module may be formed to correspond to the third and fourth parts, so that the rear end of the cabin module may fit at the front end of the rear module when the cabin module is slidingly assembled.

A side part of the cabin module may include a front seat door and a rear seat door, and when the cabin module is assembled, a front end of the front seat door and a rear end of the rear seat door may fit at the rear end of the front module and the front end of the rear module, respectively.

A rail structure may be provided between the rear end of the front module and the front end of the cabin module or between the front end of the rear module and the rear end of the cabin module, so that the cabin module may be slidingly assembled.

A front insertion rail may be provided at the rear end of the front module in a width direction of the vehicle, and a front protrusion may be provided at the front end of the cabin module, so that the front protrusion may be inserted in and slides along the front insertion rail.

A rear insertion rail may be provided at the front end of the rear module in a width direction of the vehicle, and a rear protrusion may be provided at the rear end of the cabin module, so that the rear protrusion may be inserted in and slides along the rear insertion rail.

The rail structure may include a protrusion and an insertion rail. The protrusion may be provided with a protruding neck and a flange extending from an end of the neck, and the insertion rail may be provided with a through hole in which the neck is inserted and slides and with a guide groove extending from the through hole to allow the flange to be inserted and slide.

A first power connector and a first data connector may be provided on a side of the cabin module, and a second power connector and a second data connector may be provided on a side of the platform module. The first and second power connectors and the first and second data connectors of the cabin module and the platform module may be interlocked when the cabin module is slidingly coupled, so that power and data may be interchanged between the cabin module and the platform module.

The first power connector and the first data connector of the cabin module may be provided on a lower end of the side of the cabin module, and the second power connector and the second data connector of the platform module may be provided on an upper end of the side of the platform module.

The first power connector and the first data connector of the cabin module may be provided on a first connector body that is formed as an integrated, single body, and the second power connector and the second data connector of the platform module may be provided on a second connector body that is formed as a single body.

The first connector body may have a protrusion at a center thereof, the first power connector may be provided on the protrusion and the first data connector may be provided outside the protrusion. The second connector body may have a recess groove into which the protrusion is inserted, the second power connector may be provided in the recess groove, and the second data connector may be provided outside the recess groove.

A sealer may be provided between an outer surface of the protrusion and an inner surface of the recess groove, so that the first power connector and the second power connector may be sealed from an outside when the first connector body and the second connector body are coupled to each other.

In the user-assemblable vehicle according to embodiments of the present invention, each component of the vehicle is modularized, and the purchaser or owner of the vehicle can select each component and assemble a desired vehicle.

Specifically, since the use of the vehicle may be changed even when only one component is replaced without changing an existing configuration of the vehicle, a vehicle model may be changed without high cost.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION OF EMBODIMENTS

Figure 1:
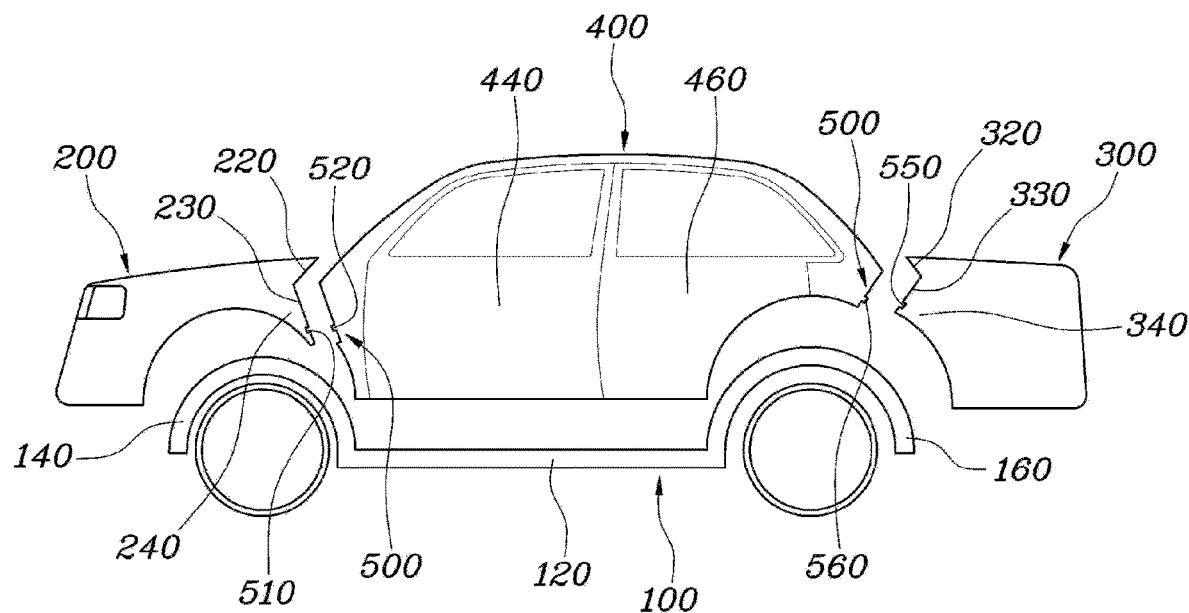
FIG. 1 is a view showing a user-assemblable vehicle according to an embodiment of the present invention.

Hereinbelow, embodiments of the present invention will be described in detail with reference to the accompanying drawings. Throughout the drawings, the same reference numerals will refer to the same or like parts.

Generally, most vehicles are manufactured in an integral type, and the consumers select only one from various vehicle models manufactured in advance, but they cannot individually design the vehicle according to desired tastes or uses.

In addition, when the owner wants to change the use of the vehicle after purchase, the owner should purchase a separate vehicle or rent another vehicle, therefore cost thereof increases. In view of the foregoing, embodiments of the invention allow the owner to design a vehicle the way he wants or to change the use of the vehicle when desired is developed.

Figure 2A:
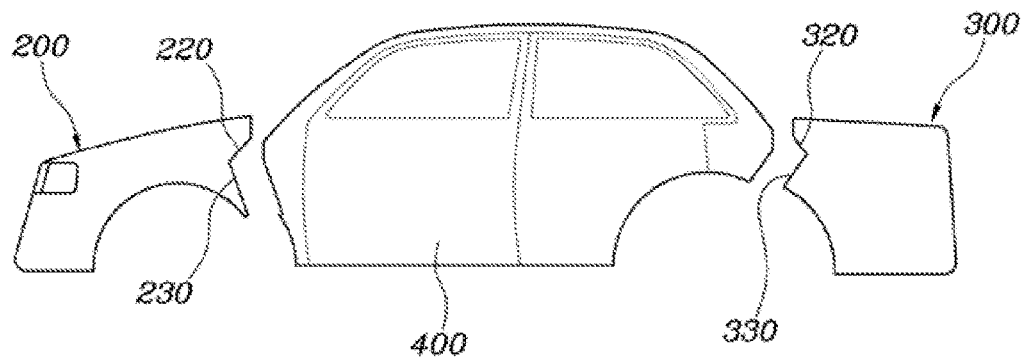
FIGS. 2A and 2B are views showing a plurality of front modules, cabin modules, and rear modules of the user-assemblable vehicle according to the embodiment of the present invention.
Figure 2B:
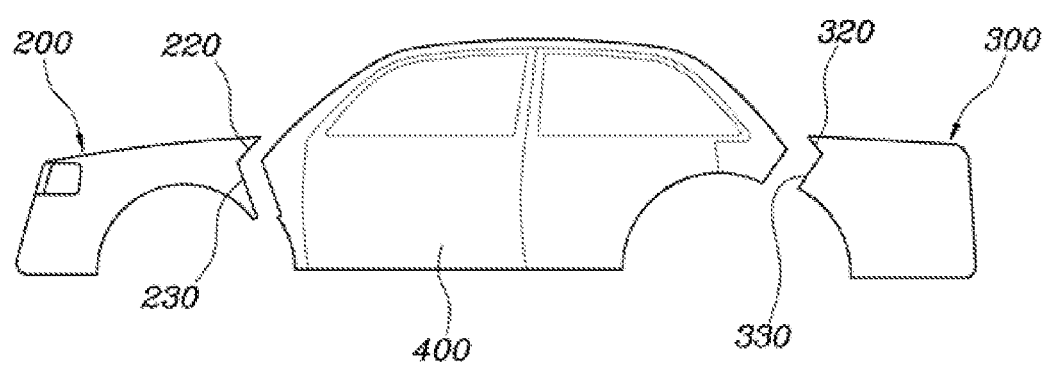
Figure 2C:
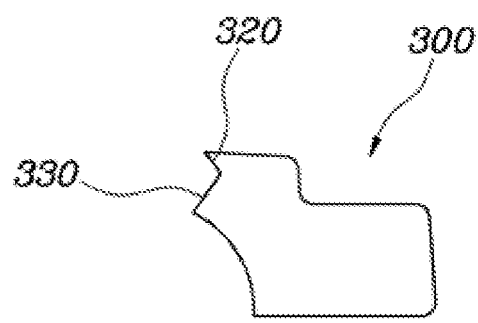
FIG. 2C is a view showing rear module of the user-assemblable vehicle according to the embodiment of the present invention.
Figure 3:
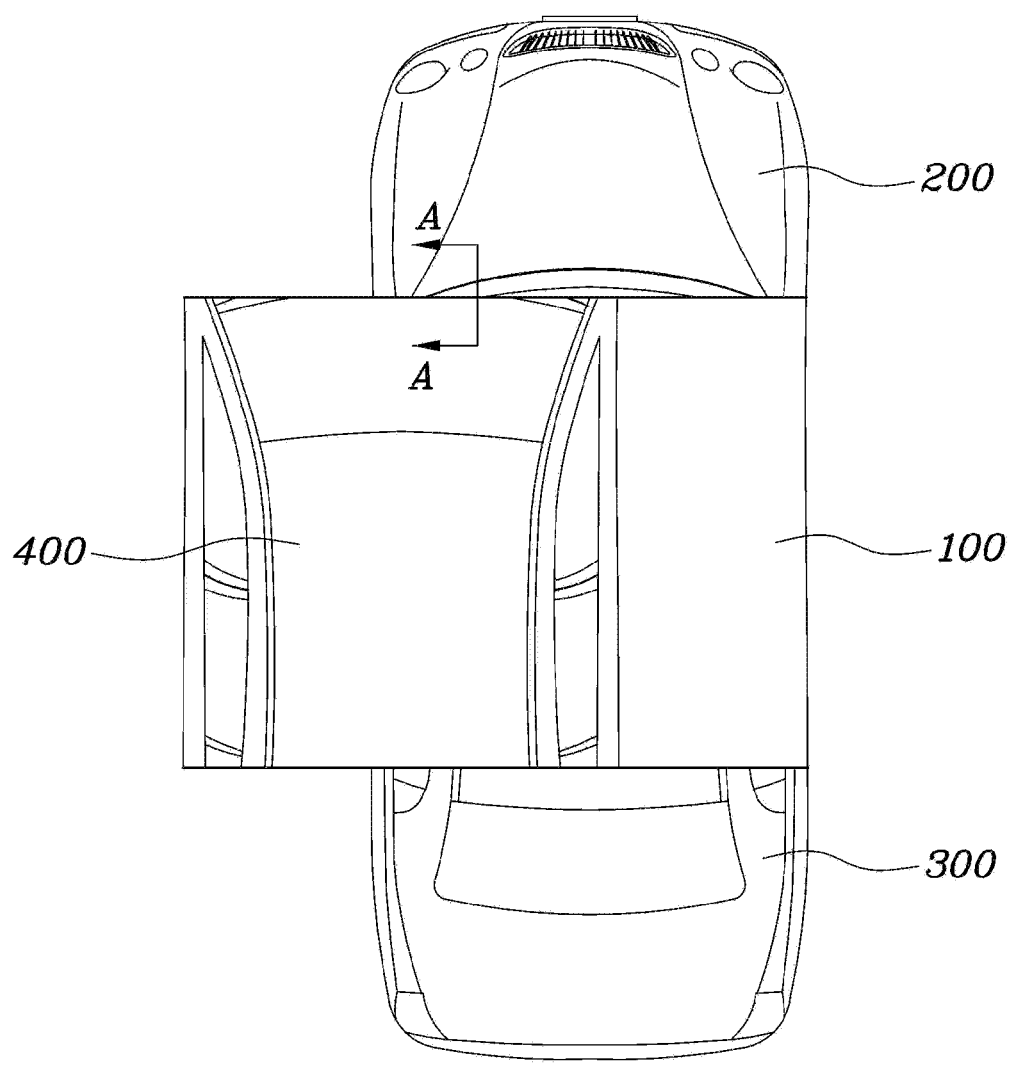
FIG. 3 is a view showing a state in which a cabin module of the user-assemblable vehicle according to the embodiment of the present invention is slidingly assembled to the vehicle.
Figure 4:
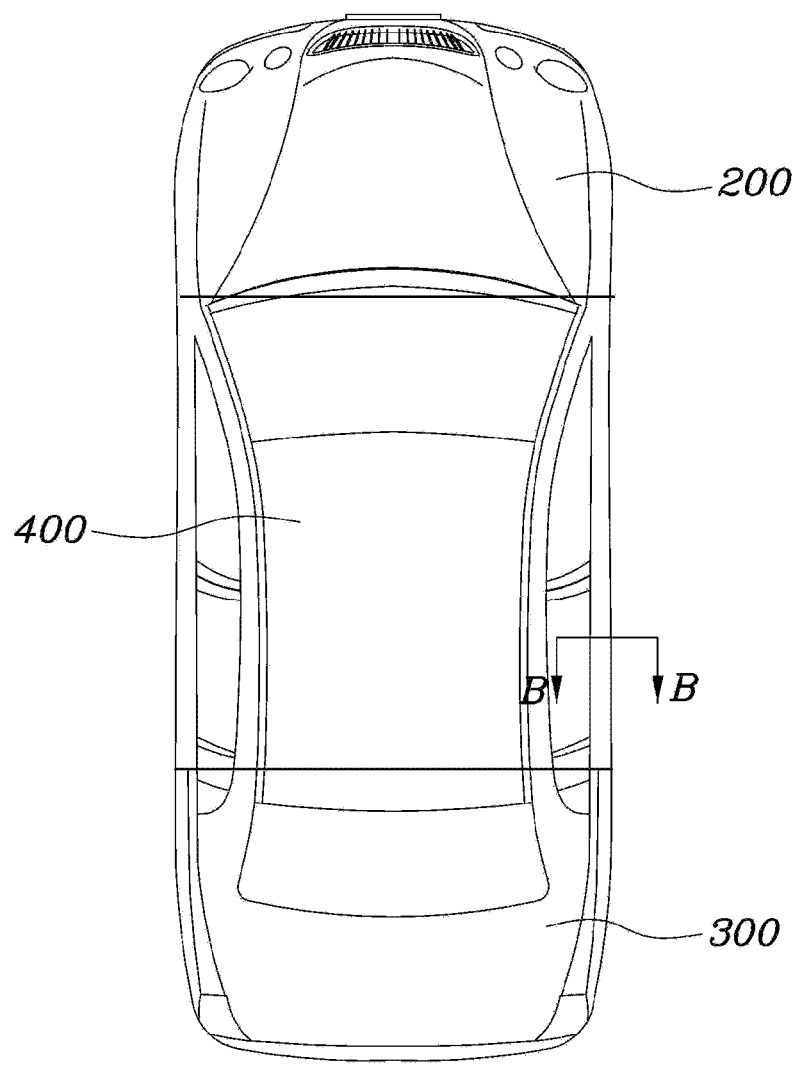
FIG. 4 is a view showing an assembled state of the user-assemblable vehicle according to the embodiment of the present invention.
Figure 5:
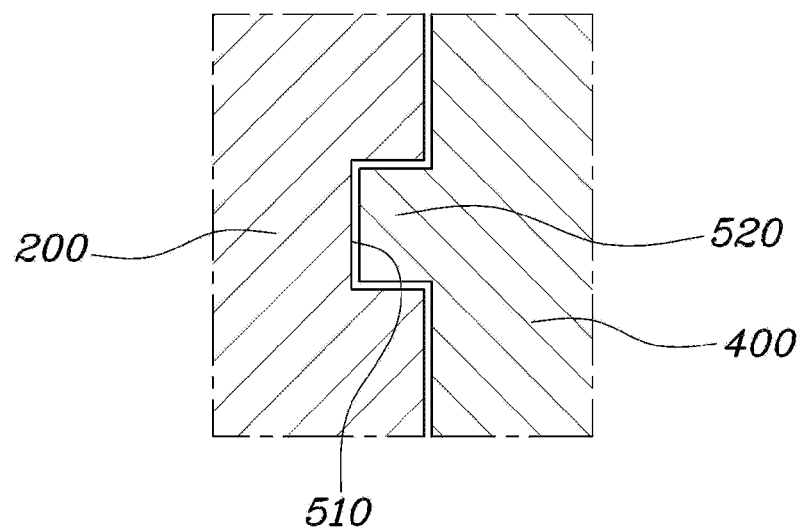
FIG. 5 is a cross-sectional view according to an embodiment taken along line A-A of FIG. 3.
Figure 6:
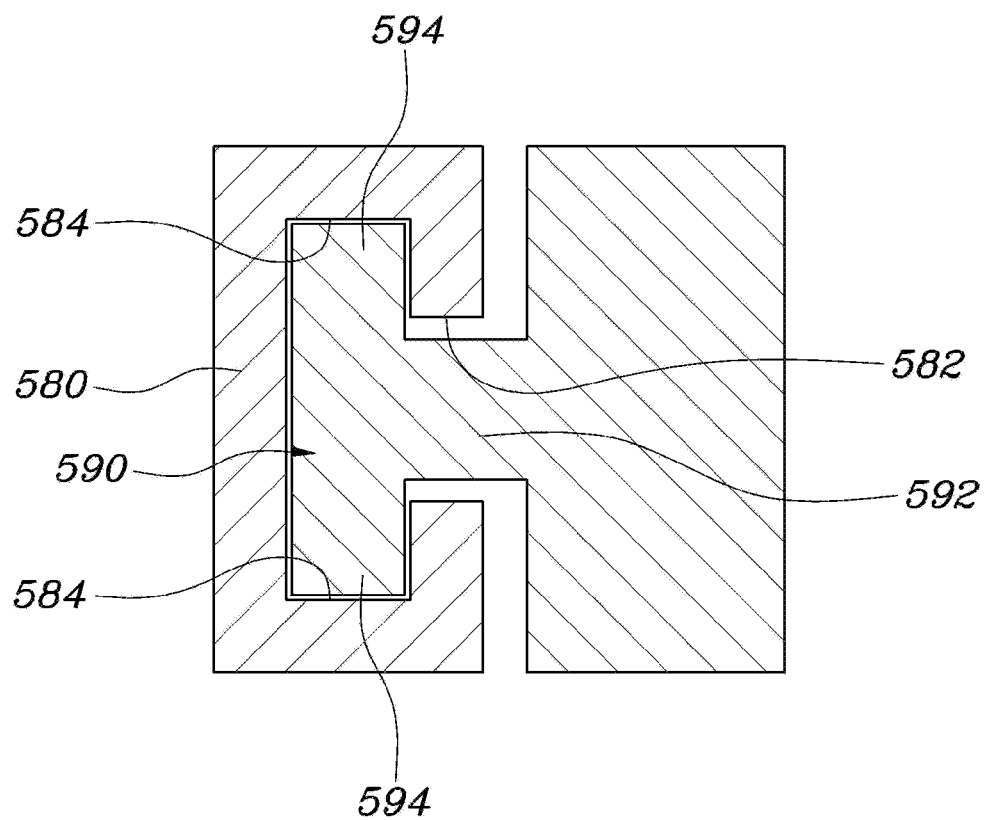
FIG. 6 is a cross-sectional view according to another embodiment taken along line A-A of FIG. 3.
Figure 7:
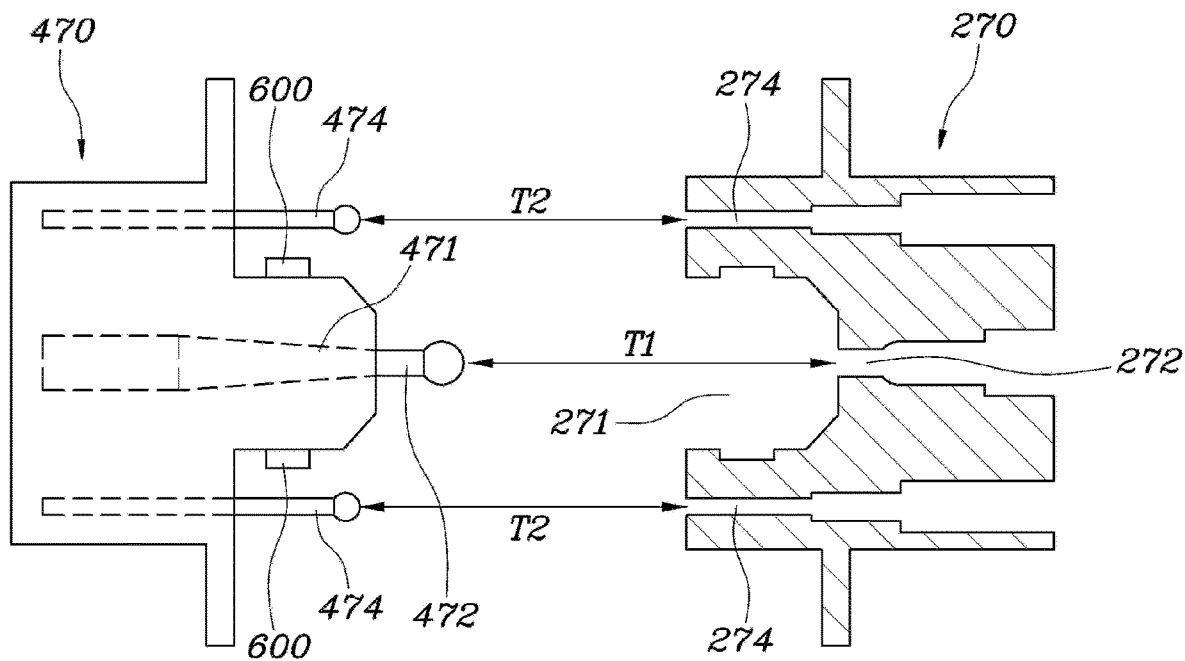
FIG. 7 is a cross-sectional view taken along the B-B line of FIG. 4.

FIG. 1 is a view showing a user-assemblable vehicle according to an embodiment of the present invention. FIGS. 2A and 2B are views showing a plurality of front modules, cabin modules, and rear modules of the user-assemblable vehicle according to the embodiment of the present invention, and FIG. 2C is a view showing rear module of the user-assemblable vehicle according to the embodiment of the present invention. FIG. 3 is a view showing a state in which a cabin module of the user-assemblable vehicle according to the embodiment of the present invention is slidingly assembled to the vehicle. FIG. 4 is a view showing an assembled state of the user-assemblable vehicle according to the embodiment of the present invention. FIG. 5 is a cross-sectional view according to an embodiment taken along line A-A of FIG. 3. FIG. 6 is a cross-sectional view according to another embodiment taken along line A-A of FIG. 3. FIG. 7 is a cross-sectional view taken along the B-B line of FIG. 4.

A user-assemblable vehicle according to embodiments of the present invention corresponds to a vehicle that may be assembled with a respectively modularized platform, front, rear, and cabin. Likewise, as each component is modularized, a vehicle purchaser can select and assemble each component. Therefore, the vehicle purchaser can design a vehicle to meet a desired use. In addition, when an owner of a user-assemblable vehicle wants to change use of the vehicle, the owner can change the vehicle by changing only modules that need to be changed without purchasing a new vehicle. Accordingly, as the modules of each component of the vehicle are compatible with each other, the vehicle may be designed and replaced as desired.

A user-assemblable vehicle according to embodiments of the present invention includes: a platform module 100 forming a bottom surface of the vehicle as shown in FIG. 1, and including a floor part 120 provided with a power driving part and front and rear wheel parts 140 and 160 provided on front and rear parts of the floor part 120, respectively; a front module 200 coupled to a front part of the platform module 100 to form a front part of the vehicle; a rear module 300 coupled to a rear part of the platform module 100 to form a rear part of the vehicle; and a cabin module 400 having a space therein for accommodating passengers, and coupled to a rear end of the front module 200 at a front end thereof and coupled to a front end of the rear module 300 at a rear end thereof, and supported by the floor part 120 of the platform module 100 at a lower end thereof when the cabin module slides from a side to an opposite side of the vehicle. Therefore, the platform module 100, the front module 200, the rear module 300, and the cabin module 400 are coupled to each other to form a single integrated vehicle.

Meanwhile, when the cabin module 400 is assembled by descending downward on the vehicle in a vertical direction, the cabin module 400 may be interfered with by the rear end of the front module 200 and the front end of the rear module 300. Therefore, the cabin module 400 according to embodiments of the present invention is assembled by sliding the cabin module 400 from a side to an opposite side of the vehicle.

Specifically, the front module 200 is provided with a front wheel housing 240 corresponding to the front wheel part 140 of the platform module 100, and the rear module 300 is provided with a rear wheel housing 340 corresponding to the rear wheel part 160 of the platform module 100.

FIGS. 2A and (2B) are the views showing the plurality of front modules, cabin modules, and rear modules of the user-assemblable vehicle according to the embodiment of the present invention and FIG. 2C is a view showing rear module of the user-assemblable vehicle according to the embodiment of the present invention.

As shown in FIGS. 1 to 3, the front module 200 is selected from a front module group including a plurality of front modules 200 having different shapes and is coupled to the front part of the platform module 100. The plurality of front modules 200 having different shapes may have the same shape at rear ends thereof coupled to the front end of the cabin module 400. In embodiments, the plurality of front modules 200 has different shapes depending on use or size of a vehicle, but the rear ends thereof have the same shape, thus the front module may be easily assembled to the cabin module 400. In embodiments, depending on purchase motive of a purchaser or an owner's desire to change the vehicle use, a desired vehicle may be realized by selecting a front module 200 from the front module group and assembling the front module 200 of the vehicle.

In addition, the rear module 300 is selected from a rear module group including a plurality of rear modules 300 having different shapes and is coupled to the rear end of the platform module 100. The plurality of rear modules 300 having different shapes may have the same shape at the front ends thereof coupled to the rear end of the cabin module 400. Likewise, since the plurality of the rear modules 300 has the same shape at the front ends thereof, the rear module may be easily coupled to the cabin module 400 even when the rear modules 300 are manufactured to have different shapes. In this case, even when only the rear module 300 is replaced, the use of the vehicle may be changed to small-size, mid-size, and full-size vehicles, which is advantageous.

In addition, the cabin module 400 is selected from a cabin module group including a plurality of cabin modules 400 having different shapes and is supported by the floor part 120 of the platform module 100. The plurality of cabin modules 400 having different shapes may have the same shape at the front ends thereof that are coupled to the rear end of the front module 200 and the same shape at the rear ends thereof that are coupled to the front end of the rear module 300. In embodiments, since the front end shapes of the plurality of cabin modules 400 are the same and the rear end shapes thereof are the same, the cabin module 400 may be easily coupled to the front module 200 and the rear module 300 even when the shapes of the plurality of rear modules 300 are different from each other. Therefore, even when the shapes of the cabin modules 400 according to their uses are different from each other, the plurality of cabin modules 400 is interchangeable in the user-assemblable vehicle.

For example, in case of a user-assemblable vehicle to be transformed into an ambulance, a cabin module 400 of the vehicle may be replaced with a cabin module 400 having built-in berths, or in case of an owner of the vehicle having baby, the owner can replace a cabin module of the vehicle with a cabin module 400 for a baby, therefore, the owner can design the vehicle for desired use. Those skilled in the art will appreciate that various front modules 200, cabin modules 400, and rear modules 300 may be designed to meet various uses.

Accordingly, in case of the user-assemblable vehicle according to embodiments of the present invention, the front module 200, the rear module 300, the cabin module 400, and the platform module 100 of the vehicle are interchangeable.

Meanwhile, as shown in FIGS. 1 and 2, the rear end of the front module 200 extends upward from a lower end thereof, and includes a first part 230 inclined toward the front end of the vehicle and a second part 220 extending upward from an upper end of the first part 230 and inclined toward the rear end of the vehicle. The front end of the cabin module 400 is formed to correspond to the first part 230 and the second part 220, so that the front end of the cabin module 400 fits at the rear end of the front module 200 when the cabin module 400 is slidingly assembled.

In embodiments, since the second part 220 of the front module 200 is inclined toward the rear end of the vehicle, the cabin module 400 may be interfered with by the second part 220 when the cabin module 400 is assembled to the platform module 100 from above the vehicle in the vertical direction. Thus, when the cabin module 400 is assembled, the cabin module 400 according to embodiments of the present invention is slidingly assembled from the side of the vehicle, as shown in FIG. 3. Therefore, when assembly is completed, the user-assemblable vehicle is assembled as shown in FIG. 4.

In addition, as shown in FIGS. 1 and 2, the front end of the rear module 300 extends upward from a lower end thereof, and includes a third part 330 inclined toward the rear end of the vehicle and a fourth part extending upward from an upper end of the third part 330 and inclined toward the front end of the vehicle. The rear end of the cabin module 400 is formed to correspond to the third part 330 and the fourth part 320. Therefore, the rear end of the cabin module 400 may fit at the front end of the rear module 300 when the cabin module 400 is slidingly assembled.

In embodiments, since the fourth part 320 of the rear module 300 is inclined toward the front end of the vehicle, the cabin module 400 may be interfered with by the second part 220 when the cabin module is assembled to the platform module 100 in a vertical downward direction from the top of the vehicle. Accordingly, when the cabin module 400 is assembled, the sliding assembly according to embodiments of the present invention is performed from the side of the vehicle.

Therefore, when the cabin module 400 is assembled with the platform module 100, the front module 200, and the rear module 300, the cabin module 400 is supported by the floor part 120 of the platform module 100 at the lower part of the vehicle and is supported by the second part 220 of the front module 200 and the fourth part 320 of the rear module 300 at the upper part of the vehicle. Consequently, the user-assemblable vehicle increases stability of the passenger by preventing the cabin module 400 from being detached in the vertical direction, which is advantageous.

Meanwhile, as shown in FIG. 1, the side part of the cabin module 400 includes a front seat door 440 and a rear seat door 460, and when the cabin module 400 is assembled, a front end of the front seat door 440 and a rear end of the rear seat door 460 may fit at the rear end of the front module 200 and the front end of the rear module 300, respectively.

In addition, a rail structure 500 is provided between the rear end of the front module 200 and the front end of the cabin module 400 or between the front end of the rear module 300 and the rear end of the cabin module 400, as shown in FIG. 1, so the cabin module 400 may be slidingly assembled from the side of the vehicle along the rail structure 500.

Specifically, as shown in FIGS. 1 and 5, a front insertion rail 510 is provided at the rear end of the front module 200 in a width direction of the vehicle, and a front protrusion 520 is provided at the front end of the cabin module 400, so that the front protrusion 520 is inserted into and slides along the front insertion rail 510. In addition, a rear insertion rail 550 is provided at the front end of the rear module 300 in the width direction of the vehicle, and a rear protrusion 560 is provided at the rear end of the cabin module 400, so that the rear protrusion 560 is inserted into and slides along the rear insertion rail 550. In embodiments, since the front insertion rail 510 is provided at the rear end of the front module 200 to be recessed toward the front end of the vehicle, and the front protrusion 520 is inserted into and slides along the front insertion rail 510, the cabin module 400 may be assembled in a precise position. Likewise, since the rear insertion rail 550 is provided at the front end of the rear module 300 to be recessed backward of the vehicle and the rear protrusion 560 is inserted into and slides along the rear insertion rail 550, the assembly performance is increased by guiding to a precise position. Accordingly, when the cabin module 400 is assembled, the front insertion rail 510 and the rear insertion rail 550 guide the cabin module 400 to be precisely assembled.

In addition, as shown in FIG. 6, the rail structure 500 may include a protrusion 590 and an insertion rail 580. The protrusion 590 may be provided with a protruding neck 592 and a flange 594 extending from an end of the neck 592, and the insertion rail 580 may be provided with a through hole 582 wherein the neck 592 is inserted and slides and a guide groove 584 extending from an end of the through hole 582 and wherein the flange 594 is inserted and slides. When the cabin module is assembled, as the neck 592 and the flange 594 of the protrusion 590 are positioned in the through hole 582 and the guide groove 584, assembling is guided. Then, as the flange 594 is supported by the guide groove 584 after assembly, the cabin module 400 is not unexpectedly removed toward the front or rear end of the vehicle, which is advantageous.

Meanwhile, as shown in FIGS. 4 and 7, the cabin module 400 has a first power connector 472 and a first data connector 474 on a side thereof, and the platform module 100 has a second power connector 272 and a second data connector 274 on a side thereof. When the cabin module 400 is slidingly assembled, the first and second power connectors 472 and 272 and the first and second data connectors 474 and 272 of the cabin module 400 and the platform module 100 are interlocked, so that power and data may be interchanged between the cabin module 400 and the platform module 100. In addition, since the user-assemblable vehicle according to embodiments of the present invention is not an integral structure, a sensor, an energy source, and other compartments are dispersed to each module without being concentrated on any one module. Accordingly, the first and second power connectors 472 and 272 and the first and second data connectors 474 and 274 are interlocked so as to share power and data between the platform module 100 and the cabin module 400.

Meanwhile, as shown in FIGS. 4 and 7, the first power connector 472 and the first data connector 474 of the cabin module 400 may be provided at a lower end of the side of the cabin module 400, and the second power connector 272 and the second data connector 274 of the platform module 100 may be provided at an upper end of the side of the platform module 100. This is to prevent or avoid interference of the first power and data connectors 472 and 474 with by the floor part 120 due to the cabin module 400 being slidingly assembled.

Meanwhile, as shown in FIG. 7, the first power connector 472 and the first data connector 474 of the cabin module 400 may be provided on a first connector body 470 that is formed as a single body, and the second power connector 272 and the second data connector 274 of the platform module 100 may be provided on a second connector body 270 that is formed as a single body. In addition, the first connector body 470 has a protrusion 471 at a center thereof, the first power connector 472 is provided on the protrusion 471, and the first data connector 474 is provided outside the protrusion 471. On the contrary, the second connector body 270 has a recess groove 271 into which the protrusion 471 is inserted, the second power connector 272 is provided on the recess groove 271, and the second data connector 274 is provided outside the recess groove 271. In embodiments, when the first connector body 470 and the second connector body 270 are coupled, the first power connector 472 and the second power connector 272 provided on the protrusion 471 and the recess groove 271 are coupled, so that power may be transmitted and received T1 to each other. Likewise, the first data connector 474 and the second data connector 274 are coupled, so that data may be transmitted and received T2 to each other.

In addition, a sealer 600 is provided between an outer surface of the protrusion 471 and an inner surface of the recess groove 271, so that the first power connector 472 and the second power connector 272 may be sealed from the outside when the first connector body 470 and the second connector body 270 are coupled. Through the sealer 600, since the first power connector 472 and the second power connector 272 are sealed, leakage of water can be prevented thereby preventing power interruption.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A user-assemblable vehicle comprising:
   a platform module configured to a bottom surface of the vehicle and including a floor part provided with a power driving part and front and rear wheel parts provided on front and rear parts of the floor part, respectively;
   a front module configured to be coupled to a front part of the platform module to form a front part of the vehicle;
   a rear module configured to be coupled to a rear part of the platform module to form a rear part of the vehicle; and
   a cabin module having a space therein for accommodating passengers, wherein the cabin module is configured to be coupled to the front module and the rear module, wherein the cabin module comprises a front end is configured to be coupled to a rear end of the front module and a rear end configured to be coupled to a front end of the rear module, wherein the cabin module is wherein the cabin module is configured to slide over the platform module from a side to an opposite side of the vehicle to be coupled to the platform module such that the cabin module is supported by the floor part of the platform module.

2. The user-assemblable vehicle of claim 1, wherein the front module is provided with a front wheel housing corresponding to the front wheel part of the platform module, and the rear module is provided with a rear wheel housing corresponding to the rear wheel part of the platform module.

3. The user-assemblable vehicle of claim 1, wherein the front module is selected from a front module group including a plurality of front modules having different shapes and is coupled to the front part of the platform module, wherein each of the plurality of front modules of different shapes have the rear end to be coupled with the front end of the cabin module.

4. The user-assemblable vehicle of claim 1, wherein the rear module is selected from a rear module group including a plurality of rear modules having different shapes and is coupled to the rear part of the platform module, wherein each of the plurality of rear modules of different shapes have the front end to be coupled with the rear end of the cabin module.

5. The user-assemblable vehicle of claim 1, wherein the cabin module is selected from a cabin module group including a plurality of cabin modules having different shapes and is supported by the floor part of the platform module, wherein each of the plurality of cabin modules of different shapes have the front end to be coupled with the rear end of the front module and the rear end to be coupled with the front end of the rear module.

6. The user-assemblable vehicle of claim 1, wherein the rear part of the front module extends upward from a lower end thereof and includes a first part inclined toward a front end of the vehicle and a second part extending upward from an upper end of the first part and inclined toward a rear end of the vehicle, and the front end of the cabin module is configured to correspond to the first and second parts, so that the front end of the cabin module fits at the rear end of the front module when the cabin module is slidingly assembled.

7. The user-assemblable vehicle of claim 1, wherein the front part of the rear module extends upward from a lower end thereof and includes a third part inclined toward the rear end of the vehicle and a fourth part extending upward from an upper end of the third part and inclined toward a front end of the vehicle, and the rear end of the cabin module is formed to correspond to the third and fourth parts, so that the rear end of the cabin module fits at the front end of the rear module when the cabin module is slidingly assembled.

8. The user-assemblable vehicle of claim 1, wherein a side part of the cabin module includes a front seat door and a rear seat door, and when the cabin module is assembled, a front end of the front seat door and a rear end of the rear seat door fit at the rear end of the front module and the front end of the rear module, respectively.

9. The user-assemblable vehicle of claim 1, wherein a rail structure is provided between the rear end of the front module and the front end of the cabin module or between the front end of the rear module and the rear end of the cabin module, so that the cabin module is slidingly assembled.

10. The user-assemblable vehicle of claim 9, wherein the rail structure comprises a front insertion rail provided at the rear end of the front module in a width direction of the vehicle, and a front protrusion provided at the front end of the cabin module, so that the front protrusion is inserted in and slides along the front insertion rail.

11. The user-assemblable vehicle of claim 9, wherein the rail structure comprises a rear insertion rail is provided at the front end of the rear module in a width direction of the vehicle, and a rear protrusion is provided at the rear end of the cabin module, so that the rear protrusion is inserted in and slides along the rear insertion rail.

12. The user-assemblable vehicle of claim 9, wherein the rail structure includes a protrusion and an insertion rail, the protrusion is provided with a protruding neck and a flange extending from an end of the neck, and the insertion rail is provided with a through hole in which the neck is inserted and slides and with a guide groove extending from the through hole to allow the flange to be inserted and slide.

13. The user-assemblable vehicle of claim 1, wherein a first power connector and a first data connector are provided on a side of the cabin module, and a second power connector and a second data connector are provided on a side of the platform module, and the first and second power connectors and the first and second data connectors of the cabin module and the platform module are interlocked when the cabin module is slidingly coupled, so that power and data are interchanged between the cabin module and the platform module.

14. The user-assemblable vehicle of claim 13, wherein the first power connector and the first data connector of the cabin module are provided on a lower end of the side of the cabin module, and the second power connector and the second data connector of the platform module are provided on an upper end of the side of the platform module.

15. The user-assemblable vehicle of claim 13, wherein the first power connector and the first data connector of the cabin module are provided on a first connector body that is formed as a single body, and the second power connector and the second data connector of the platform module are provided on a second connector body that is formed as a single body.

16. The user-assemblable vehicle of claim 15, wherein the first connector body has a protrusion at a center thereof, the first power connector is provided on the protrusion and the first data connector is provided outside the protrusion, the second connector body has a recess groove into which the protrusion is inserted, and the second power connector is provided in the recess groove and the second data connector is provided outside the recess groove.

17. The user-assemblable vehicle of claim 16, wherein a sealer is provided between an outer surface of the protrusion and an inner surface of the recess groove, so that the first power connector and the second power connector are sealed from an outside when the first connector body and the second connector body are coupled to each other.

18. A method of assembling the user-assemblable vehicle of claim 1, the method comprising:
    placing the front module and the rear module over the platform module;
    coupling the front module and the rear module over the platform module; and
    sliding the cabin module in a direction extending from one side of the platform module to the other side of the platform module while the cabin module and the front module are engaged, and the cabin module and the rear module are engaged.

* * * * *